United States Patent [19]
Nguyen

[11] Patent Number: 5,920,892
[45] Date of Patent: Jul. 6, 1999

[54] METHOD AND SYSTEM FOR INHIBITING TRANSFER OF DUPLICATE WRITE ADDRESSES IN MULTI-DOMAIN PROCESSOR SYSTEMS WITH CROSS-BUS ARCHITECTURE TO REDUCE CROSS-INVALIDATION REQUESTS

[75] Inventor: Bich Ngoc Nguyen, Fountain Valley, Calif.

[73] Assignee: Unisys Corporation, Blue Bell, Pa.

[21] Appl. No.: 08/703,118

[22] Filed: Aug. 26, 1996

[51] Int. Cl.[6] .............................. G06F 13/00; G06F 13/40
[52] U.S. Cl. .......................... 711/146; 395/280; 395/293; 395/200.75; 395/200.46; 711/124
[58] Field of Search ..................................... 711/141, 146, 711/119, 120, 121, 124; 395/280, 293, 200.42, 200.43, 200.44, 200.46, 200.75

[56] References Cited

U.S. PATENT DOCUMENTS

| | | | |
|---|---|---|---|
| 5,058,006 | 10/1991 | Durdan et al. ........................... | 711/122 |
| 5,446,848 | 8/1995 | Whitlock et al. ........................ | 395/280 |
| 5,696,937 | 12/1997 | White et al. ............................. | 711/146 |
| 5,761,445 | 6/1998 | Nguyen ................................... | 395/280 |

*Primary Examiner*—Glenn Gossage
*Attorney, Agent, or Firm*—Alfred W. Kozak; Mark T. Starr; Steven R. Petersen

[57] ABSTRACT

A two domain digital network with each domain having its own system bus and its own bus exchange module permits Write operation addresses to be passed between domains. Each bus exchange module provides a match filter which prevents the passage from one bus to the other bus of a duplicate Write operation (OP) address which has already been transferred, thus relieving the busses of excess traffic when a duplicate Write OP address is being sent to a cache memory for an invalidation operation. A Read operation will nullify the match filter to then allow passage of each incoming Write OP invalidation address to the snoop invalidation queue, but prevent the passage of a subsequent duplicate Write OP address, so long as the read OP is ongoing.

7 Claims, 2 Drawing Sheets

METHOD AND SYSTEM FOR INHIBITING TRANSFER OF DUPLICATE WRITE ADDRESSES IN MULTI-DOMAIN PROCESSOR SYSTEMS WITH CROSS-BUS ARCHITECTURE TO REDUCE CROSS-INVALIDATION REQUESTS

This disclosure is related to a application U.S. Ser. No. 638,247 filed Apr. 26, 1996 entitled "Dual Domain Data Processing Network with Cross-Linking Data Queues and Selective Priority Arbitration Logic", now U.S. Pat. No. 5,761,445 which is also included herein by reference.

BACKGROUND OF THE INVENTION

In the development of computer networks, a situation often occurs where two or more digital systems are cross-linked to each other in order to pass messages between a first system having a first domain, and a second system having a second domain. Very often, each of the Central Processing Modules in each of the first and second domains will have a cache memory for immediate access to useful data and additionally, will also have invalidation queues needful to invalidate stale data which may occur during the operation of the system. Thus, as seen in FIG. 2, a dual domain system having a first domain 10a and a second domain 10b, are cross-linked to enable communications to occur with each other.

Referring to FIG 2, there is seen the first domain 10a having a Central Processing Module (CPM) 11a connected to a cache 18a. The Central Procesing Module 11a also has an internal invalidation queue 11iqa (snoop invalidation queue) which is used to accumulate addresses which must be subsequently used to invalidate addresses and data in the cache 18a.

The Central Processing Module (CPM) 11a is connected to a local bus or first domain bus 14a designated as the SBUS. Connected to the SBUS 14a (local bus) is an Input/Output Module (IOM) 12a, a System Control Module (SCM) 13a and a Bus Exchange Module (BEM) 23ea. The system control module 13a holds an arbitration circuit (ARBIT CKT) logic unit 13ra which regulates those commands, messages or transfers that will get priority or access to the local bus 14a (SBUS). A Memory Bus 16a (MBUS) connects the System Control Module 13a to the Bus Exchange Module (BEM) 23ea, providing access to a first domain Main Memory 15a.

The second digital domain 10b of this system shows a similar arrangement where the Central Processing Module 11b having a snoop invalidation queue 11iqb within, is connected to its personal cache memory 18b. The Central Processing Module 11b connects to the remote bus 14b, designated OSBUS, which buys is connected to an Input/Output Module (IOM) 12b, and is also connected to a System Control Module (SCM) 13b and a Bus Exchange Module 23eb. Likewise in the second domain, the second domain main memory 15b is connected via a memory bus 16b to both the Bus Exchange Module (BEM) 12eb and the System Control Module (SCM) 13b which also has an arebitration circuit (ARBIT CKT) logic unit 13rb.

Now, again referring to FIG. 2, it will be noted that each Bus Exchange Module provides a link between the local bus 14a and the remote bus 14b. Further, for example, the Bus Exchange Module 23ea contains an address queue 23qa which has the purpose of accumulating Write-OP addresses which it has sensed as occurring on the remote bus 14b. At the appropriate time, these Write addresses can be transferred from the BEM 23ea over to the local bus 14a and loaded into the invalidation queue 11iqa for subsequent invalidation operations onto the cache 18a.

Now referrring to the Bus Exchange Module 23eb of the second domain 10b, it will be seen that the address queue 23qb is used to accumulate Write OP addresses occurring on the local bus 14a which can then be transferred on to the remote bus 14b for transfer and accumulation to the second domain invalidation queue 11iqb which can then perform invalidation operations in the second domain cache memory unit 18b.

Each of the Bus Exchange Modules 23ea and 23eb are also seen to contain Message Queues 21qa and 21qb which involve the storage of message which are being transferred between the local bus and the remote bus, or between the remote bus and the local bus, as the occasion requires.

As an example of the cross-linking between domains, it will be seen in FIG. 2 that the CPM 11a or the IOM 12a of the first domain may place a Write OP on the local SBUS 14a. This Write OP will be place in the Write OP address queue 23qb, which will then place it onto the second domain remote bus OSBUS 14b, from whence it can then be placed in the Snoop Invalidation Queue 11iqb in the second domain.

In the other direction, the Central Processing Module CPM 11b, or the Input/Output Module IOM 12b of the second domain, can initiate a Write OP onto the remote bus 14b, OSBUS which will then be placed into the Write OP address queue 23qa, which will then pass this information onto the local bus 14a., SBUS, and thence place the Write address into the Snoop Invalidation Queue 11iqa of the first domain.

In reguard to the Message Queues 21qa and 21qb, the following interlinking operations can occur. The CPM 11b and the IOM 12b of the second domain may pass a message on the remote bus 14b over into the message queue 21qa of the first domain, which can then pass the message onto the local bus 14a, SBUS, which can then convey the message over to the Central Processing Module CPM 11a or to the Input/Output Module IOM 12a of the first domain.

Similarly, going from the first domain to the second domain, the CPM 11a and the IOM 12a can place a message onto the local bus 14a, SBUS, which will then be conveyed to the second domain Bus Exchange Module BEM 23eb, which it is placed in the message queue 21qb. This is then conveyed onto the second domain remote bus 14b, OSBUS, and thence to the final target module which may be the CPM 11b or the IOM 12b, which may be the final destination modules for the message in the second domain, 10b.

Thus, the first domain modules, are operating to provide the appropriate priority of access (via the arbitration logic 13ra) to the first domain bus 14a while, at the same time, the first domain provides a Write OP Address Queue 23qa, and a Message Quenue 21qa which interlink with the second domain. Then also, the second domain using the Bus Exchange Module BEM 23eb, provides the Write OP Address Queue 23qb and the Message Queue 21qb which then provide an interlinking between the second domain and the first domain busses. Concurrently, the second domain System Control Module SCM 13b uses its arbitration logic (ABIR CKT) 13rb to determine which module will have priority of bus access to the second domain remote bus 14b (OSBUS).

When the Cental Processing Module, CPM 11a, of the first domain system 10a performs a Write operation with the Memory Module 15a of the same domain, then the busses and ports in the first domain 10a are used. Additionally, while the Write operation is being performed, the busses and ports are used to snoop or "spy" on the particular Write operation involved and subsequently used to invalidate any entry in the cache 18b of the second domain data processing system 10b, which corresponds to the new write entry made in the Memory Module 15a of the first domain system 10a that was being written to. As an example, if the entry at address 12345 is being written into the memory 15a of the first domain 10a, then also a message is sent via the busses and ports over to the cache 18b of the processing system of the second domain 10b, advising that the cache entry having that particular address 12345 should also be invalidated.

Another operational condition that can occur is where the Central Processing Module's CPM 11a of the first domain system 10a performs a Write operation on the Memory Module 15b of the second domain 10b. Again, the particular Write operation is performed by used of the busses and the ports. However, while that Write operation is being performed, the busses and ports are used to spy on this Write operation and thus to advise the cache 18b of the second domain Central Processing Module 10b to invalidate any cache entry in the cache 18b which corresponds to an entry in the Memory Module 15 b that is being Written into.

For brevity of discussion, sometimes the generalized number 11 will be used to designate the Central Processing Module, the generalized number 12 for the Input/Output Module, the generalized number 23 for the Bus Exchange Module, the generalized number 15 for the Main Memory Module and generalized number 13 for the System Control Module.

Another factor arise in that each of the so-called "Write" operations illustrated as being initiated by the Central Processing Module CPM 11, can also be initiated by the Input/Output Module IOM 12. In each of these cases, the data appears on the system bus 14 as originated from the Input/Output Module IOM 12, rather than from the Central Processing Module CPM 11.

In FIG. 2 it will be seen that the first domain Write OP address queue 23qa accumulates Write-address from the remote bus 14b of the second domain 10b and then sends the address onto the first domain local bus 14a, SBUS, which can then subsequently pass them onto the invalidation queue 11iqa for invalidation cycles into the cache memory 18a.

Likewise, the address queue 23qb in the second domain Bus Exchange Module 23eb, then also accumulates Write-addresses from the first domain local bus 14a and then sends them onto the second domain bus 14b (OSBUS) over to the second domain CPM 11b into the invalidation queue 11iqb for invalidation operations on the second domain cache memory 18b.

The presently described system uses an E-Mode protocol which involves blocks of four words which are transferred in sequence as a block of four words. E mode protocol is involved in Unisys A-Series processor architecture and is the interface between the machine and the program. It comprises a set of operator instructions and data types for communication between modules, and uses a 4-word block for data transfers. This 4-word protocol is described in U.S. Pat. No. 5,696,937.

Difficulties can arise in that the address queue, 23qa, which accumulates Write-OP addresses from the second domain remote bus 14b, OSBUS, can sometimes "lock-up" the bus 14a of the first domain, when there are long bursts of Write-OPs occurring on the bus 14b. In order to prevent such a locking-up of the bus 14a, the Bus Exchange Module, BEM, is generally given the "highest Priority" for access to the first domain local bus 14a, SBUS. But this occurs only during the time period the Bus Exchange Module is being "serviced", that is to say, if there should be occurring a request from the CPM 11a or from the IOM 12a, the arbiter (ARB) 13ra will then switch bus access priority of bus 14a over to the CPM 11a module or to the IOM 12a module thus stopping the flow of Write-address information from the second domain into the first domain.

The present system seeks to reduce the number of invalidation requests which can cause excess bus traffic leading to multiple "retry operations" which can then adversely affect the performance of the system. The retry operations occur when data is sought to be transmitted to a receiving module but the transmission could not be effectuated and must be repeated to try to reach the receiving module.

The present system addresses the situation of reducing the number of invalidation requests under certain conditions that occur so that the throughput of information transfer will not be adversely affected.

SUMMARY OF THE INVENTION

In a dual domain digital system each domain of which has its own common system bus and each domain has a Bus Exchange Module to permit intercommunication between the first and second common system busses, the system functions so that any Write operations in either the first or second domain are accumulated in an address queue which can then be passed onto the other domain to provide for invalidation cycles to the cache units or the main memory modules of that domain.

The Bus Exchange Module spies on the system bus of the other remote second domain for Write addresses and then generates invalidation requests to its local bus. When the address of the Write OPs are in the same block of four words and this address matches an address that is currently in a match-filter located in the Bus Exchange Module, then the particular Write operation is ignored and no invalidation request will then be generated from the bus of one domain into the bus of the other domain.

Thus, by reducing the number of "unneeded" invalidation requests, much bus traffic can be avoided and multiple requests for retry operations can be diminished in the network, thus enabling a much higher throughput to occur and also to avoid many types of overload or locking problems which might take place.

Thus, for example, all Writes on the second domain bus OSBUS will cause the first domain Bus Exchange Module BEM to generate invalidation requests but these are only "conditionally transferred" to the first domain invalidation queue, thus reducing the number of invalidation requests to be passed on the first domain bus over to the first domain cache invalidation queue.

The presently described match filter is located in each one of the first and second domains of the Bus Exchange Modules (BEMs). The match filter will work to compare any new Write-address with an address presently residing in the filter. In this case, if a match (duplicate address) occurs, then there is no need for that newly received Write address to be forwarded on the system bus onto the Central Processing Module for invalidation of its cache memory unit. Consequently, system bus traffic is reduced thus allowing greater useful throughput.

DESCRIPTION OF PREFERRED EMBODIMENT

Figure 2:
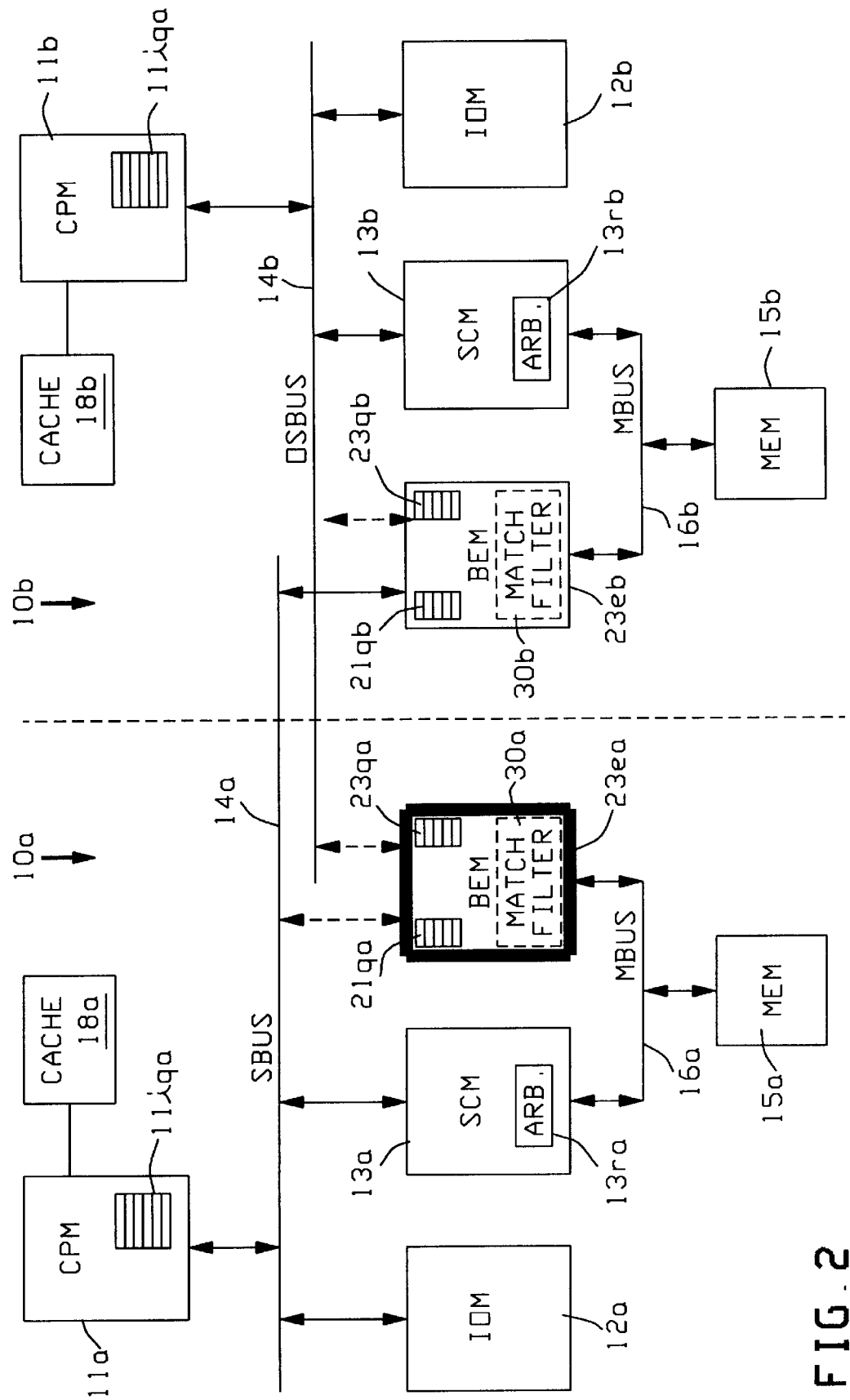
FIG. 2 is a block diagram of a dual domain system each of which has its own system bus and each of which has its own Bus Exchange Module allowing cross-linking or intercommunication from one domain to the other.

As was seen in FIG. 2, each of the first and second domains had its own respective Bus Exchange Module. This Bus Exchange Module was seen to hold an address queue 23q and a message queue 21q in each case. Connections were arranged so that each Bus Exchange Module could provide a linking mechanism between the local bus 14a of the first domain and the remote bus 14b of the second domain.

The present system now includes a special match-invalidate filter in each of the Bus Exchange Modules. This match-invalidate filter is designated as element 30 and thus there will be an element 30a in the first domain Bus Exchange Module and an element 30b in the second Bus Exchange Module.

Figure 1:
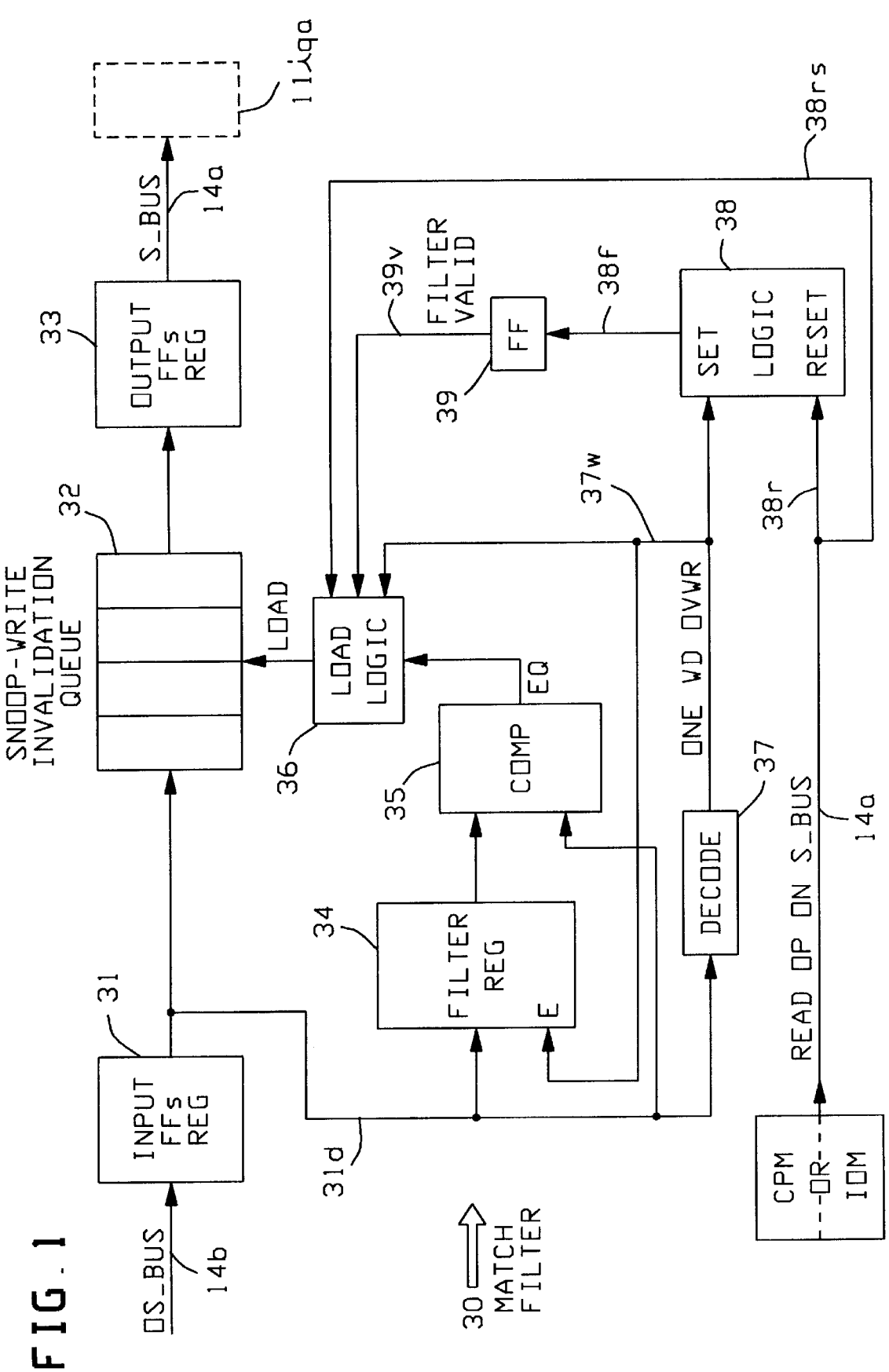
FIG. 1 is a diagram illustrating the operation of the match filter logic unit which is located in each Bus Exchange Module of a dual domain network.

Referring now to FIG. 1, there is seen the block diagram of the match invalidate filter. For example, data on the second domain bus 14b (OSBUS) is fed into an Input flip-flop register 31 from whence it is fed into the filter invalidate queue 32 which may also be called a Snoop-Write Invalidation Queue 32. The output of the Input flip-flop register 31 is also fed to the filter register 34 in addition to being fed to the decoder 37 and also to the comparator 35.

The decoder 37 feeds an output of a "one-word" overwrite, over into the filter register 34 (at input E) and also to the load logic unit 36. A set-reset logic unit 38 receives the one word input (overwrite) from the decoder 37 and a reset input from a Read OP operation (when it occurs) on the first domain bus 14a (SBUS). The Read OP can be sourced from either the Central Processing Module 11 (FIG. 2) or the Input/Output Module 12 (FIG. 2).

The Output, of the Input flip-flop register 31 is fed into the comparator 35 where it is compared with an address residing in the filter register 34. If a match occurs (EQ), the match signal (EQ) is fed to the load logic unit 36, which then provides a load signal to the filter invalidation queue 32.

An Output line 38f from the set-reset logic 38 is fed to a flip-flop 39 which provides a filter "valid" signal to the load logic 36. The filter "valid" signal on line 39v, indicates that the newly received overwrite address had matched a "previously received" overwrite address (which was incomplete, i.e., not passed onto the invalidation queue 11iqa). As a result, the newly received overwrite address on bus 14b will not be passed onto bus 14a (SBUS), thus relieving the bus 14a of extra duplicative traffic. Thus, no "second" invalidation request will be allowed on bus 14a since there was an earlier request for the same address. Also, the Read-OP on the first domain bus 14a is fed to the load logic unit 36 on line 38rs. The logic unit 36 provides a "load" signal to the matching address of the invalidation filter queue 32.

If the Write address on the second domain bus 14b (OSBUS) matches exactly with the address that is currently in the filter register 34, then the Write operation is ignored and no invalidation request is generated onto the first domain system bus 14a SBUS. Further, a Read operation occurring on the SBUS 14a renders the filter "invalid", that is to say, there will be no inhibiting action to the transfer of Write-OP addresses onto the output Flip-Flop Register 33 to the first domain bus 14a (SBUS) and onto the invalidation queue 11iqa of FIG. 2. Thus, any Write OP address occurring during a Read OP will be passed onto the bus 14a for transfer to Invalidation Queue 11iqa.

Referring to FIG. 1, the Input flip-flop register 31 is used to store any command and address that appears on the remote second domain bus 14b. The decoder 37 is used to decode the command which is stored in the Input FF register 31 and is used to recognize the "overwrite command" on the second domain bus 14b, OSBUS. An overwrite command is a request from the CPM (11a, 11b) to write one word into memory.

The combinational logic unit 38 of FIG. 1 is used to set or reset the filter "valid" flip-flop 39. An overwrite command appearing on the second domain bus 14b is sensed by the decoder 37 and used to set the valid flip-flop 39 to a "1" setting as long as there is a "no Read" operation occurring on the first domain SBUS 14a. Any Read operation occurring on the first domain bus 14a, SBUS, will reset the filter valid flip-flop 39 back to "zero". Functionally, this means that all addresses of overwrite commands are compared against the address in the filter register 34 as long as there is no Read operation on SBUS 14a.

The filter-valid flip-flop 39 is used to validate the comparison being carried out by the comparator 35. When the flip-flop 39 reaches a "1", then the Output of the comparator 35 is considered "valid" and then is used in determining the loading of the Snoop-Write Queue 32. When the Filter Valid FF output equals "1", then the Load Logic 36 will stop the newly presented Write OP address (on bus 14b from getting passed onto bus 14a (Filter Valid).

If the flip-flop 39 output is "0", then the output of the comparator 35 is considered "invalid", that is the match filter (30a, 30b), FIG. 2 will no longer stop newly presented overwrite addresses from being passed onto bus 14a and onto Invalidation Queue 11iqa. Thus, when the Flip-Flop 39 is in its invalid (=0) condition, a match address (EQ) will enable the Write OP address to go from bus 14b over to 14a. The setting and re-setting of the filter valid flip-flop 39 is determined by combinational logic 38, as was described above.

The filter register 34 is used to store the Write addresses that appear on the second domain system bus 14b, OSBUS. This register 34 is loaded only when the decoder 37 decodes the presence of an "overwrite" command on the second domain system bus 14b, OSBUS.

The comparator 35 compares the address in the Input register 31 (for example, the address currently appearing on the second domain bus OSBUS 14b) against the address (of a prior overwrite command) that was stored in the filter register 34 in order to determine whether a match occurs.

The comparison is done on the high order bits of the address only (omitting the two least significant bits), because all of the four addresses which have the same high order bits are considered to belong to a "block" of four words. The last two bits of these words are 00, 01, 10, and 11. The invalidation that will be carried out on the Central Processing Module (11a) of the first domain 10a is done based on a block address. For all of the four addresses that belong to a block, the Bus Exchange Module BEM 23ea only needs to forward one invalidation request over to the CPM 11a.

The load logic 36 of FIG. 1 works to determine whether to load the Snoop-Write Queue 32 or not. The Snoop-Write Queue 32 is "not loaded" when these conditions are all met. These conditions include:

(a) there is no Read operation on the first domain bus 14a (SBUS);

(b) the decoder 37 decodes an overwrite command;

(c) the filter valid flip-flop 39 is set to "1"; and
(d) the output of the comparator 35 is "1" (this means the address in the Input register 31 matches the address in the filter register 34).

When these conditions are met, there is no need to load the Snoop-Write Queue 32 with the Write address, because this address (or one of the three other addresses that belong to the same block as this Write address) has already been sent to the Snoop-Write Queue 32 before.

To send the Write address again to the Snoop-Write Queue 32 and then onto the first domain system bus 14a over to the CPM 11a will unnecessarily increase the traffic on the bus 14a and this is the factor that the present system is resolving by reducing the traffic on the bus.

The Snoop-Write Queue 32 is used to queue the Write addresses and the Bus Exchange Module (BEM) will then issue invalidation requests for those addresses onto the first domain system bus 14a. The Write addresses will then eventually get into the invalidation queue 11iqa in the CPM 11a and then will be used to invalidate the cache 18a. The loading of the Snoop-Write Queue 32 is determined by the load logic unit 36 of FIG. 1.

In FIG. 1, the Output Flip-Flop register 33 is used to store the invalidation request command, along with the Write address which is loaded out from the Snoop Write Queue 32 in order to send it out on the first domain system bus 14a over to the CPM 11a.

As was previously discussed, the Bus Exchange Module (BEM) 23ea snoops for Writes on the second domain system bus 14b, OSBUS, and puts the Write addresses into its Snoop-Write Queue 32 of the match filter 30 (30a, 30b) (FIG. 2). The BEM then generates invalidation requests for these addresses to the CPM 11a, as long as the match filter is "invalid", i.e., the output of Filter Valid FF is equal to "0".

Further, the Bus Exchange Module 23ea (FIG. 2) decodes messages on the second domain system bus 14b, OSBUS, which are destined to receivers residing in the first domain 10a, then puts the messages into its Message Queue and then forwards the messages to the receivers by means of the first domain system bus 14a, SBUS.

It should be noted that the Snoop-Write Queue 32 in FIG. 1 is part of the match invalidation filter logic 30 which is referenced to 30a and 30b of FIG. 2). The invalidation queue 11iq is the queue in the Central Processing Module which stores and holds the addresses waiting to be invalidated in the respective cache memory 18 (18a, 18b).

In terms of functional operation and referring to FIG. 1, the filter register 34 can store one address. The next Write OP which is decoded by the decoder 37, will then overwrite the address previously stored in the filter register 34 through use of the line 37w, which connects to the E input of filter register 34. As an example, the first Write OP appears in the input flip-flop register 31 and will then be stored in the filter register 34 and also stored in the Snoop-Write Queue 32.

The next, or second Write OP which appears on line 31d (as output of the input flip-flop register 31) will then be compared with the first Write OP which was previously stored in the filter register 34 in order to determine if a match occurs. Just after this comparison is done, the address of the second Write OP is stored in the filter register 34 for comparison of the next oncoming, or third Write OP which will later appear on line 31d. The third Write OP will then be stored and be used to compare with the next oncoming, or fourth Write OP and so on.

The load logic unit 36 is used to load the address of the Write OP which appears on line 31d, but which address does "not match" an existing address in the filter register 34, and this is only done when the filter valid line 39v is equal to "1" (Valid), thus placing the address into Snoop-Write Queue 32 for later use as an address to be invalidated.

It will be seen that the set reset logic 38 transmits on line 38f to the flip-flop 39 which provides the filter valid signal to the load logic 36. When the filter valid line 39v is equal to "1" (Valid) and the comparator 35 has found a match between the present and the next Write OP addresses, then the Snoop Write Queue 32 (which holds invalidation addresses) will not be loaded with the matching address that was placed in the filter register 34. Thus the subsequent matching address will be filtered out and "not loaded" into the Snoop-write invalidation queue by the elements in the box 50 delineated by the long dashed lines of FIG. 1.

In FIG. 1, the line 38f resets the filter valid flip-flop 39 to "0" which then makes the line 39v equal to "0" (Invalid). When the line 39v is equal to "0" (Invalid), then the load logic unit 36 will load the Write OP address that appears on line 31d even if the new incoming address matches the existing address in the filter register 34. Thus, in this case, the matching and filtering operation is disabled, since when line 39v is equal to "0", each one of the incoming addresses will be loaded into the Snoop-Write Queue 32.

In FIG. 1, when the filter valid line 39v is equal to "1", then the load logic 36 will not load an address from the filter register 34 into the Snoop-Write Queue 32 so that the "subsequent" or "second" Write OP address will never get passed on from the OSBUS 14b over to the SBUS 14a.

The E-Mode protocol used in this system reads a four-word packet, but can Write either one word or four words. When the processor in the CPM 11a does a Read OP from the memory 15a, four words are transferred to the cache unit 18a (FIG. 2). Now, if the Input/Output Module IOM 12b does a four word Write on the OSBUS 14b, then those four-word Write addresses are always passed onto the SBUS 14a for use as invalidation addresses for the cache 18a.

The match filter 30 of FIG. 1 is only interested in the one word Overwrite OP which originated on the OSBUS 14b. The address of the one-word Overwrite OP will then be passed onto the SBUS 14a for invalidation of "all four words" in the cache unit 18a. Thus, it is redundant to invalidate these four words in the cache unit 18a again, if the "next" one word Overwrite OP on the bus 14b happens to be in the same four-word block address as the previous Overwrite OP.

For example, if four words in the cache unit 18a are at the addresses 4, 5, 6 and 7, then any one word overwrite OP on the OSBUS 14b to either one of the addresses 4, 5, 6 or 7, --- assuming, for example, address "5", this Overwrite OP will be passed onto the SBUS 14a in order to invalidate all four words in the cache unit 18a. Then, if the next one-word Overwrite OP is addressed to Write to either address 4, 5, 6, or 7 again, ---- in this case suppose it is addressed to address "7", then there is no need to pass the address onto the SBUS 14a, because all four addresses have already been invalidated by the previous Write OP.

The filter register 34 of FIG. 1 is a flip-flop type of device. It merely stores the address currently on line 31d at the rising edge of the clock. Therefore, the newly appearing or second address that appears on line 31d is compared to the address that was previously stored in the filter register 34, and only then, at the rising edge of the next clock (after the comparison is done in comparator 35), the newly arriving or second Write address, will overwrite the previously written earlier address. For example, the previously written earlier address in the filter register 34 is address "7" and the newly appearing address on line 31d is the address "5". Then, at this time address "5" is compared against address "7", and at the rising edge of the next clock, after the comparison is done, address "5" is stored into the filter register 34 for subsequent comparison of a newly appearing address, such as a third address which will appear on line 31d.

In FIG. 1 when there is a Read OP on the bus 14a (SBUS) which is conveyed on line 38r over to the reset logic 38, it will be seen that the Snoop-Write Queue 32 gets "enabled" so that it will continue to pass all of the Write OP addresses coming in on bus 14b and pass them over to bus 14a which is the SBUS. This enablement means that the incoming Write OP addresses are now being loaded into the Snoop-Write Queue 32 for purposes of being transferred in order to invalidate a word packet in the cache unit (18a). In this sense, it could be considered that the entire match filter 30 is now "disabled" because it is not filtering out matched addresses. This disabling mechanism is seen in FIG. 1 as block 52 which is encompassed with dotted lines.

Each CPM 11 has a cache memory 18 that are designed to work on a block of four-word addresses. All invalidations to the cache memory 18 is done on a block basis. Therefore, if the Bus Exchange Module BEM 23e has already sent an invalidation request for an address "A" over to the CPM, and if subsequent Write addresses happen to be in the same block (thus having the same address) as the previous address "A", then there is no need to send them again over to the Central Processing Module CPM because the whole block has already been invalidated in the cache memory by the previous Write to the address designated "A".

The question arises as to whether this filtering scheme can be made to work for all occasions, but unfortunately, this is not always the case. That is the reason why it was necessary to provide the filter valid flip-flop in the architecture in order to disable the filtering mechanism when needed.

The filter valid flip-flop 39 is reset to "0" (Invalid) (to disable the filtering) when there is a Read operation on the local bus 14a indicating that the cache memory 18 in the CPM 11 will be updated. If the cache memory 18 is updated with new data, and if the filtering mechanism is not disabled, then some Writes in the second domain remote system 10b are inhibited (filtered) from reaching the cache memory 18a a on the first local CPM 11a, and the processor might have a chance at this time to get stale data from the cache 18a.

Whenever the filter valid flip-flop 39 is reset to "0", then all comparisons (of Write addresses to be compared to the address stored in the filter register 34), are then ignored. Write addresses will be loaded into the Snoop-Write Address Queue 32 unconditionally until the filter valid flip-flop 39 is set to "1" again by another overwrite command on the second domain's system bus, remote bus 14b. Then at this stage, the filtering is "enabled" to inhibit the transfer of addresses from one bus to the other (when a subsequent Write address matches the prior Write address) and works to benefit overall throughput for this system, by reducing bus traffic.

Shown herein has been a data processing network linking two separate data processing domains or systems which involve a first domain with a local system bus and a second domain with a remote system bus. A Bus Exchange Module (BEM) is set up to snoop Write addresses, for example, on the second domain's remote system bus 14b, in order to put these addresses into the Bus Exchange Module's match filter 30 having a Snoop-Write Queue 32, and to generate invalidation requests onto the Central Processing Module CPM on the first domain's local system bus 14a for queuing up the invalidation addresses into the invalidation queue 11iqa. In order to keep traffic on the system busses to a manageable level, the Bus Exchange Module has been provided with a match-invalidation filter 30 to prevent unnecessary (duplicate) invalidation requests to be passed on to the Central Processing Module CPM, thus keeping the bus utilization at a lower and a more satisfactory level, while reserving the useful bus bandwidth to other requesters on a bus.

While other embodiments of the described selective invalidation Snooping system might be implemented; the match filter operational system shown is encompassed by the following claims.

What is claimed is:

1. A method for alleviating the data traffic passing from a first system bus to a second system bus wherein a series of time-sequential Write operation (OP) addresses are categorized as a just prior write operation (OP) address and a subsequent Write operation (OP) address where said subsequent Write operation (OP) address is fed to a comparison means holding said just prior stored Write operation (OP) address, said comparison means located in a bus exchange module (BEM) connecting to said first and second system busses, such that when said subsequent and prior Write operation (OP) addresses match each other, a specialized set of steps will occur, said method comprising the steps of:

(a) copying and storing for a limited period of time, each newly appearing prior Write operation (OP) address appearing on said first system bus;

(b) sending a copy of each newly appearing subsequent Write operation OP address on said first system bus to a comparison means;

(c) comparing each newly appearing subsequent Write operation (OP) address with the just prior stored Write operation (OP) address:

(d) finding a match between said newly appearing subsequent Write operation (OP) address and said prior stored Write operation (OP) address;

(e) preventing the transfer, from said first system bus to said second system bus, of said newly appearing subsequent Write operation (OP) address when it matches said just prior stored Write operation (OP) address.

2. The method of claim 1 further including the step of:

(f) nullifying the step (e) of preventing the transfer of said newly appearing subsequent Write operation (OP) address when a Read operation (OP) occurs on said second system bus.

3. In a network interconnecting first and second computer domains having respective first and second cross bus filter means for regulating which Write operation (OP) address, of a sequence of Write OP addresses designated as a prior Write operation (OP) address and subsequent Write OP address, on a first system bus, will be allowed to transfer onto a second system bus, each of said filter means comprising:

(a) a first set of digital modules connected by a first system bus;

(b) a second set of digital modules connected by a second system bus;

(c) wherein each of said first and second digital modules includes a bus exchange module (BEM) which interconnects said first and second system busses;

(d) each said bus exchange modules (BEMS) holding one of said first and second cross bus filter means;

(e) each cross bus filter means including:

(e1) means to receive said prior Write OP address from said first system bus;

(e2) storage means for storing said prior Write OP address from said first system bus;

(e3) comparison means for comparing for a match of said subsequent Write operation (OP) address with said prior Write operation (OP) address in said storage means;

(e4) Snoop-Write invalidation queue means for enabling transfer of said subsequent Write operation (OP) address from said first system bus to said second system bus if no match occurred in said comparison means, and including;

(e4a) means for stopping the transfer of said subsequent Write operation (OP) address when a match does occur;

(e4b) decoder means for enabling said prior Write operation (OP) address to be stored in said storage means;

(e4c) means to set a validity flip-flop means to enable the loading of said Snoop-Write invalidation queue means when a match does not occur;

(e4d) said validity flip-flop means for enabling or disabling a load logic means;

(e4e) said load logic means for loading a subsequent Write operation (OP) address into said Snoop Write invalidation queue means when there is no match of said subsequent Write operation (OP) address and said prior Write operation (OP) address.

4. A system for inhibiting the transfer of a subsequent Write operation (OP) address, occurring after a prior Write address, from a first system bus to a second system bus when said subsequent Write operation (OP) address matches said prior Write operation (OP) address, comprising:

(a) a first set of digital modules connected by said first system bus including:

(a1) a first central processing module (CPM) having a first invalidation queue and first cache memory, said first CPM including means for generating Write operation (OP) addresses;

(a2) a first I/O Module for sending and receiving data including Write operation (OP) addresses;

(a3) a first System Control Module for controlling access to said first system bus;

(a4) a first Bus Exchange Module having a first match filter means for regulating the transfer of said subsequent Write OP address from said first system bus to said second system bus;

(b) a second set of digital modules connected by said second system bus including:

(b1) a second CPM having a second invalidation queue and second cache memory including means for generating a Write operation (OP) address;

(b2) a second I/O Module for sending and receiving data including a Write operation (OP) address;

(b3) a second System Control Module for controlling access to said second system bus;

(b4) a second Bus Exchange Module having a second match filter means for regulating the transfer of said subsequent Write operation (OP) address from said second system bus to said first system bus;

(c) wherein each of said match filter means includes:

(c1) means to stop the transfer between said first and second system busses of a subsequent Write operation (OP) address which matches said prior Write operation (OP) address.

5. The system of claim 4 wherein each of said match filter means further includes:

(c2) means to disable said means to stop so that all Write operation (OP) addresses on said first or second system bus will be transferred to said second or said first system bus respectively.

6. In a dual domain digital network where each domain has digital modules connected to a dedicated system bus in its domain, a system for inhibiting duplicate Write operation (OP) OP addresses from being transferred from one bus to the other bus comprising:

(a) a first domain having first digital modules including a first central processing module with a first cache invalidation queue, said first digital modules connected to a first system bus and including a first bus exchange module;

(b) a second domain having second digital modules including a second central processing module with a second cache invalidation queue, said second digital modules connected to a second system bus and including a second bus exchange module;

(c) each bus exchange module including:

(c1) means to sense when a subsequent Write operation (OP) address, waiting to be transferred from said second or first system bus to said first or second system bus respectively matches a prior Write operation (OP) address which has already been placed in a Snoop-Write queue for later transfer to said second or first cache invalidation queue, including;

(c1a) means to inhibit the transfer of said subsequent Write operation (OP) address from said second or first system bus to said first or second system bus respectively when said subsequent Write operation (OP) address matches said prior Write operation (OP) address.

7. The system of claim 6 wherein each bus exchange module includes:

(c1b) means to disable said means to inhibit the transfer, when a Read operation (OP) occurs on said first or second system bus.

* * * * *